(12) United States Patent
Gadson (10) Patent No.: US 8,673,149 B1
(45) Date of Patent: Mar. 18, 2014

(54) LIQUID FILTER ASSEMBLY

(76) Inventor: Horace Lester Gadson, Sunnyvale, CA (US)

( * ) Notice: Subject to any disclaimer, the term of this patent is extended or adjusted under 35 U.S.C. 154(b) by 86 days.

(21) Appl. No.: 13/209,435

(22) Filed: Aug. 14, 2011

Related U.S. Application Data (60) Provisional application No. 61/373,794, filed on Aug. 13, 2010.

(51) Int. Cl.
| | |
|---|---|
| *B01D 35/00* | (2006.01) |
| *B01D 27/14* | (2006.01) |
| *B01D 29/05* | (2006.01) |
| *B01D 29/56* | (2006.01) |
| *B01D 35/28* | (2006.01) |

(52) U.S. Cl.
USPC ........... 210/335; 210/339; 210/346; 210/435; 210/438; 210/439; 210/445; 210/446; 210/451; 210/453; 210/455; 210/456; 210/473; 210/479; 210/489; 210/94; 210/95

(58) Field of Classification Search
USPC ......... 210/335, 339, 439, 446, 453, 456, 346, 210/435, 438, 445, 451, 455, 300, 314, 317, 210/320, 473, 479, 489, 252, 255, 262, 266
See application file for complete search history.

(56) References Cited

U.S. PATENT DOCUMENTS

| | | | | |
|---|---|---|---|---|
| 2,027,876 A | * | 1/1936 | Pennebaker | 210/183 |
| 2,579,053 A | * | 12/1951 | Schulstadt | 210/247 |
| 4,731,178 A | * | 3/1988 | Rosenberg | 210/232 |

* cited by examiner

*Primary Examiner* — Benjamin Kurtz
(74) *Attorney, Agent, or Firm* — Allen D. Hertz, P.A.; Allen D. Hertz (57) ABSTRACT

A liquid filter assembly comprising a filter subassembly is inserted within an elongated tubular filter body, enclosed by a pair of end caps. The filter subassembly includes a plurality of filtration discs placed onto a tubular core and inner support member. A disc aperture is provided concentrically through each filtration disc. An outer filter support member and a central filter support member support each filtration disc. The outer filter support member engages with an interior of the elongated body and an end wall engages with the disc perimeter. The central filter support member engages with an exterior of the inner support member and an end wall engages with the peripheral edge about the filtration disc aperture. Fluid passes through the first end cap orifice, continuing through the inner support member, transferring flow through the filtration discs, returning through the inner support member, and exiting the opposite end cap orifice.

20 Claims, 9 Drawing Sheets

LIQUID FILTER ASSEMBLY

CROSS-REFERENCE TO RELATED APPLICATION

This Non-Provisional Utility application claims the benefit of U.S. Provisional Patent Application Ser. No. 61/373,794, filed on Aug. 13, 2010, which is incorporated herein in its entirety. Aug. 13, 2011 falls on a Saturday; therefore the applications are co-pending through the next business day (Aug. 15, 2011).

BACKGROUND OF THE INVENTION

1. Field of the Invention

The present invention relates to a reusable liquid filter and more specifically to a filter comprising a plurality of filtering discs positioned within a filtering conduit and supported by a central core and a series of filter support members.

2. Discussion of the Related Art

Filtration systems are incorporated into a variety of liquid processing facilities. The filtration can be integrated into purification systems for treating water, oil and other lubricants, and the like.

Filtration is a mechanical or physical operation that is used for the separation of solids from a fluid by interposing a medium through which only the fluid can pass. Oversize solids in the fluid are retained, but the separation is not complete; solids will be contaminated with some fluid and filtrate will contain fine particles (depending on the pore size and filter thickness).

Sieving is a simple and convenient technique of separating particles of different sizes. One example is the use of a small sieve for sifting flour through very small holes, which allow only very fine flour particles to pass through. The coarse particles are retained in the sieve or are broken up by grinding against the screen windows. Depending upon the types of particles to be separated, sieves with different types of holes are used.

Filtration differs from sieving, where separation occurs at a single perforated layer (a sieve). In sieving, particles that are too big to pass through the holes of the sieve are retained. In filtration, a multilayer lattice retains those particles that are unable to follow the tortuous channels of the filter. Oversize particles may form a cake layer on top of the filter and may also block the filter lattice, preventing the fluid from passing through the filter. Commercially, the term filter is applied to membranes where the separation lattice is so thin that the surface becomes the main zone of particle separation, even though these products might be described as sieves.

Filters can become blocked over time. The denser the amount of particulate matter disposed within the fluid, the quicker the filter becomes impassable. The cost of replacing a filter can become fiscally limiting for applications that require frequent replacement.

Impoverished nations generally do not have the luxury of distributed potable water. It would be beneficial to provide a low cost filter for removing particles and other contaminants from water obtained from stationary bodies of water such as ponds and lakes, running bodies of water such as streams and rivers, and other sources. The populace within these regions is further limited by the limited access to tools.

Filtration of densely contaminated liquids can cause frequent replacement of the filters. One such example would be an oil spill. To maintain low costs, it would be desirous to provide a reusable filter assembly, wherein the filtration portion is low cost and easily replaced.

SUMMARY OF THE INVENTION

The present invention is directed to a liquid filter assembly comprising a housing and a replaceable, low cost filter medium.

In a first aspect of the present invention, a liquid filter assembly comprises:

an elongated tubular filter body defined by a first body edge, a second body edge, an exterior surface spanning between the first body edge and the second body edge, and an interior surface spanning between the first body edge and the second body edge, said inner surface defining a interior void passing the elongated tubular filter body;

a first filter end cap having a first filter orifice, the first filter end cap designed to removably engage with the elongated tubular filter body proximate the first body edge;

a end wall having a second filter orifice, the end wall continuous about the second body edge;

a tubular core and inner support member spanning between the first filter orifice and the second filter orifice;

a first plurality of central transfer conduits located at a first end of the tubular core and inner support member;

a second plurality of central transfer conduits located at an opposite end of the tubular core and inner support member;

a flow diversion member located within an interior void of the tubular core and inner support member and between the first plurality of central transfer conduits and the second plurality of central transfer conduits;

at least one filtration disc defined by an outer peripheral edge and having a centrally located filtration disc assembly aperture, wherein the outer peripheral edge of each of the at least one filtration disc is of a size and shape of the interior void defined by the inner surface of the elongated tubular filter body and the centrally located filtration disc assembly aperture is of a size and shape defined by a cross section of an exterior surface of the tubular core and inner support member;

at least two outer filter support members, each outer filter support member having an outer diameter for placement and retention within the interior void of the elongated tubular filter body and an inner diameter sized to engage with the filtration disc perimeter;

at least two central filter support members, each central filter support member having an inner diameter for placement onto an exterior of the tubular core and inner support member and an outer diameter sized to engage with the filtration disc proximate the filtration disc assembly aperture;

wherein the tubular core and inner support member is inserted through the centrally located filtration disc assembly aperture, and outer filter support members and central filter support members are placed on each side of and sandwiching the filtration disc therebetween.

While another aspect of the liquid filter assembly wherein the end wall is provided by a second filter end cap sized to removable engage with the second end of the elongated tubular filter body.

With another aspect incorporates at least one central transfer conduit through each end of the tubular core and inner support member.

Yet another aspect incorporates at least one central transfer filter orifice through the central filter support member.

Wherein another aspect incorporates registration feature in each of the tubular core and inner support member and the central filter support member to align the at least one central transfer conduit and the at least one central transfer filter orifice, respectively.

Another aspect incorporates a plurality of liquid filter assemblies in series.

In another aspect, the filter central core can be fabricated of a plurality of layers.

In another aspect, the filter central core can be fabricated of a plurality of layers, wherein at least two layers are fabricated of different materials.

In yet another aspect, the elongated tubular filter body is fabricated of a transparent material for inspection of the filters.

With another aspect, a flow diversion member is assembled within a central portion of the tubular core and inner support member to divert the flow of the liquid through the central transfer conduits.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
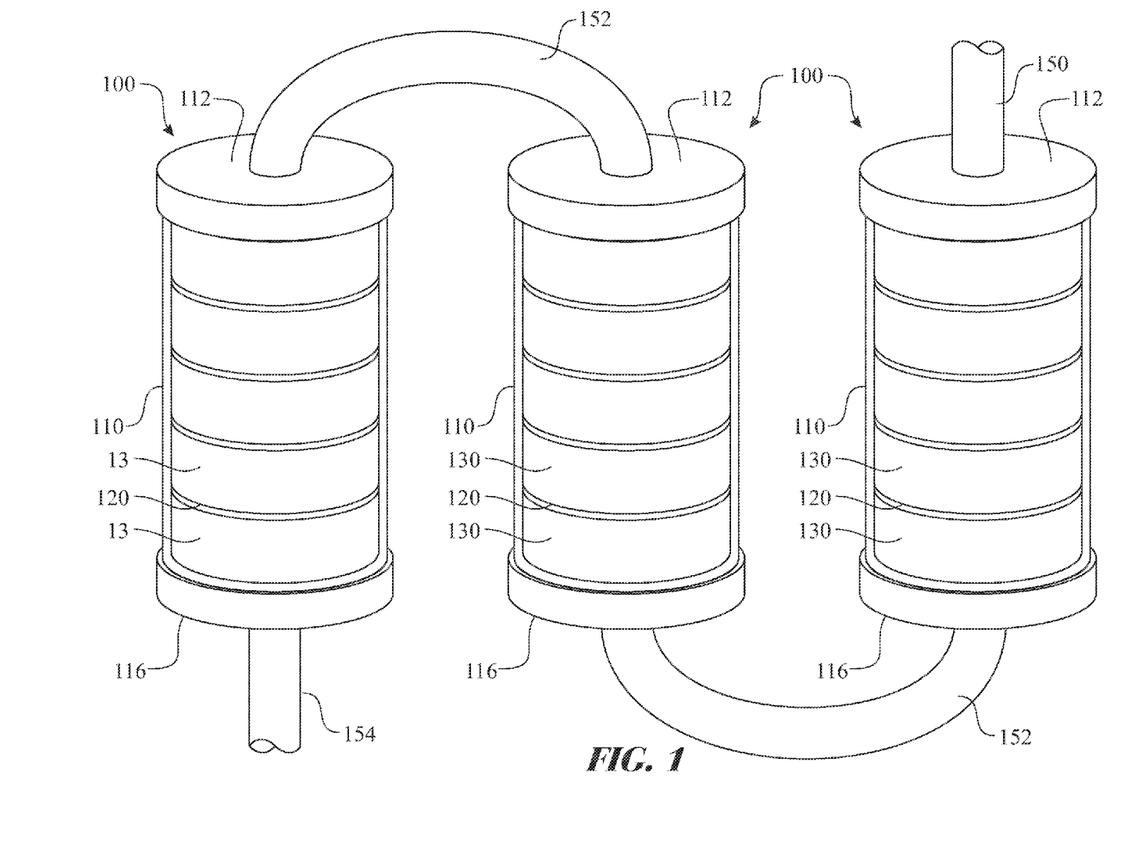
FIG. 1 presents an isometric view of a plurality of disc filter assemblies configured in a serial relation.
Figure 2:
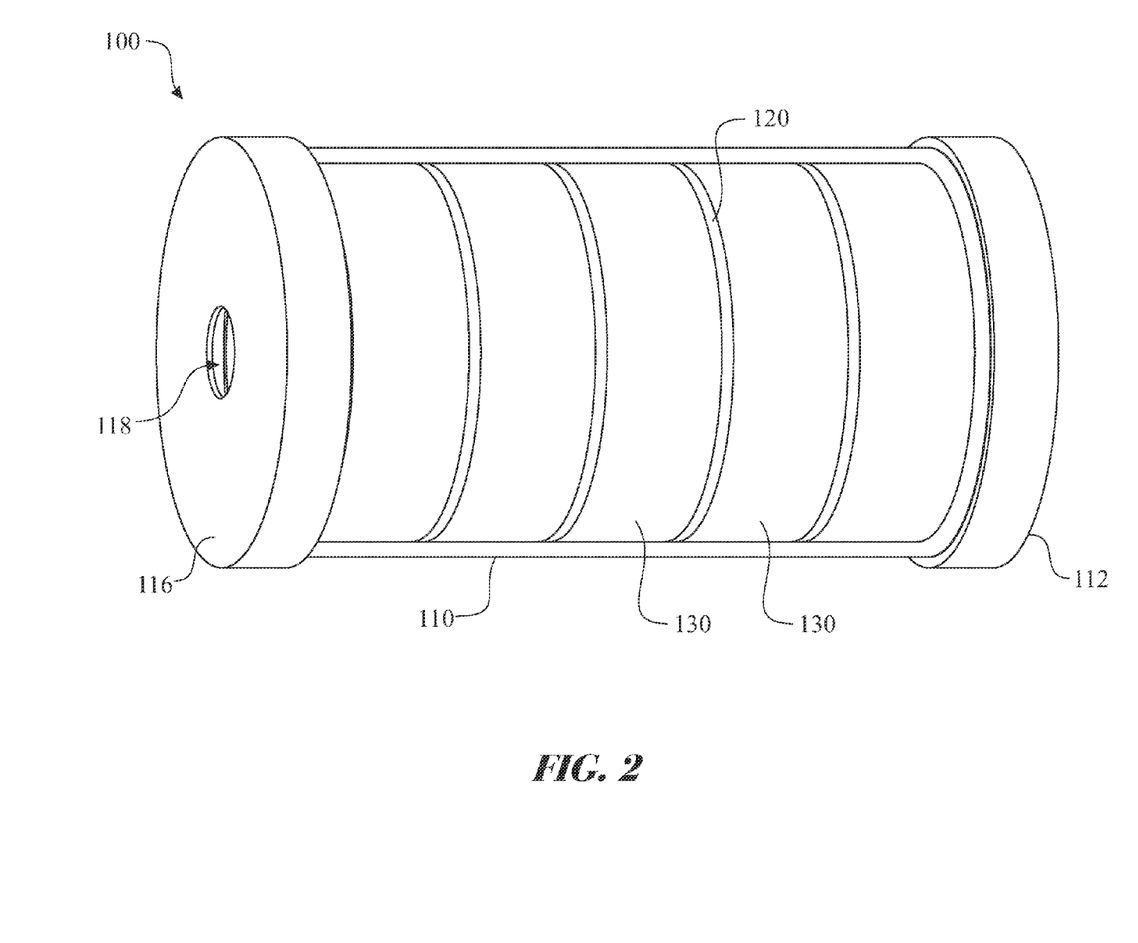
FIG. 2 presents an isometric view of the disc filter assembly initially illustrated in FIG. 1.
Figure 3:
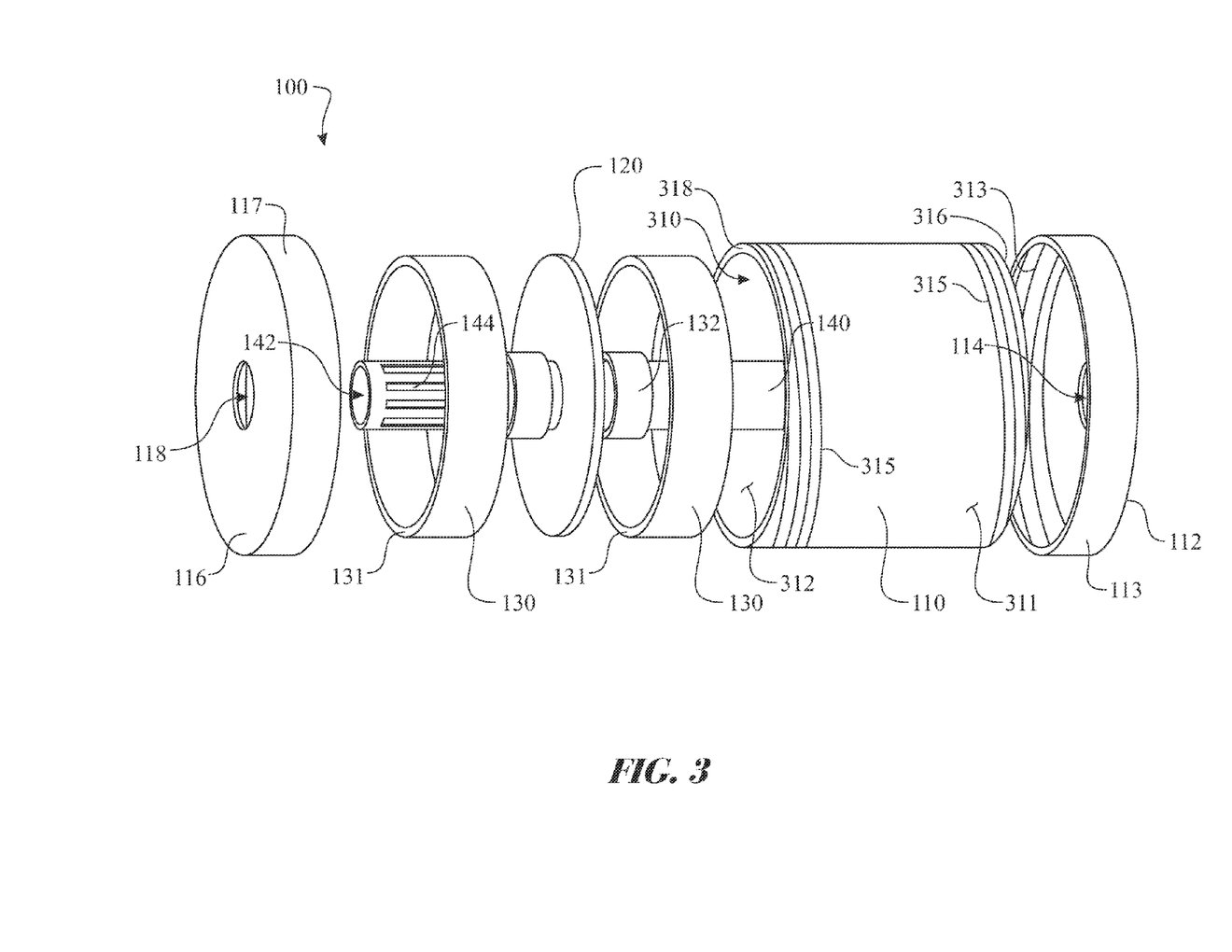
FIG. 3 presents an isometric exploded assembly view of the disc filter assembly initially illustrated in FIG. 1.
Figure 4:
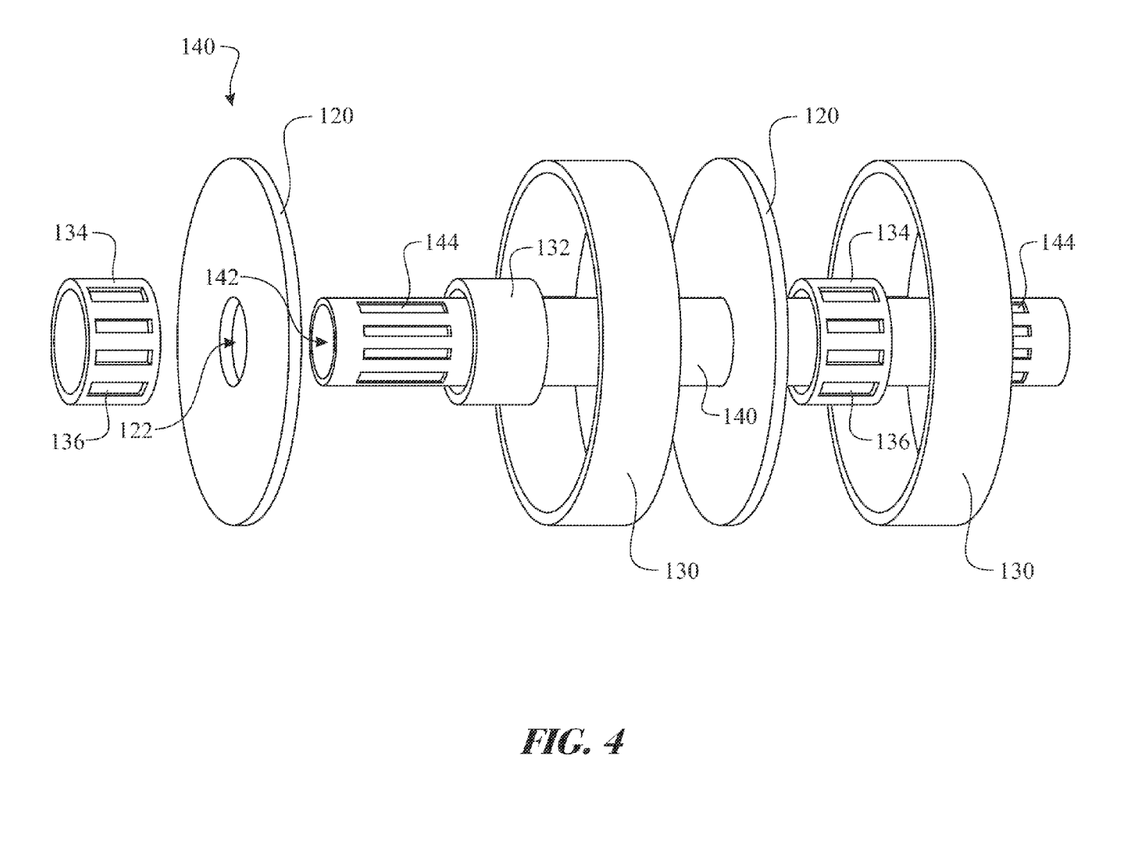
FIG. 4 presents an isometric exploded assembly view of a filter subassembly.
Figure 5:
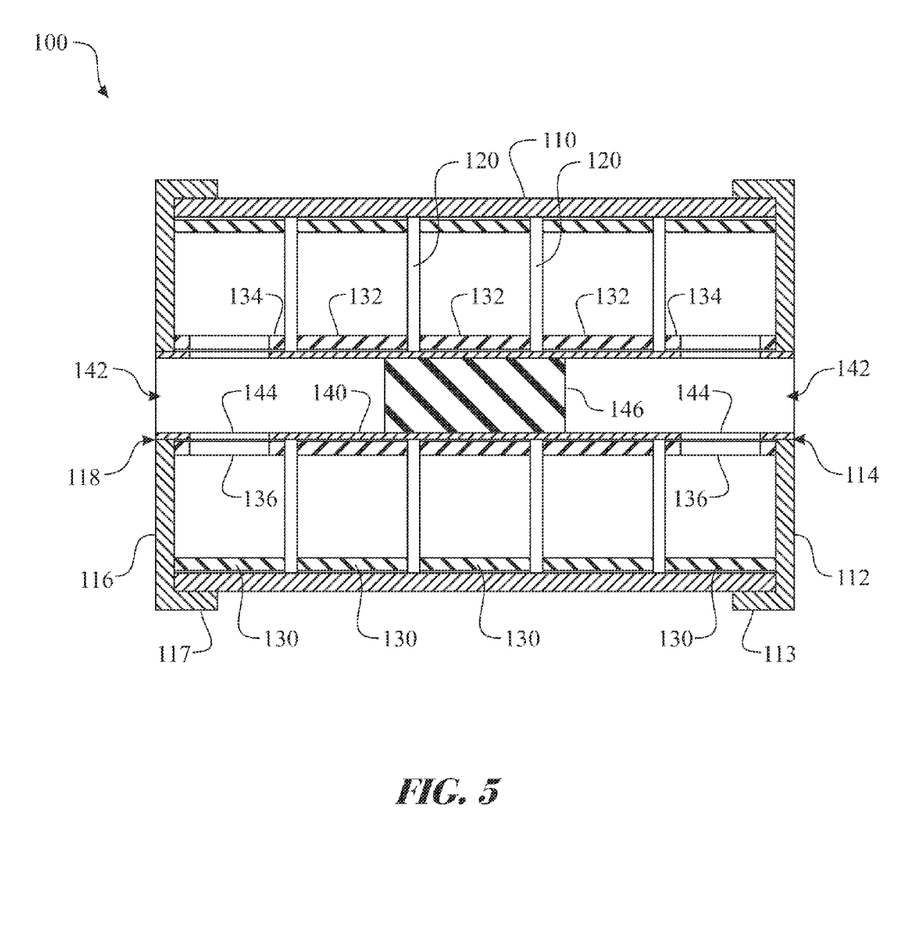
FIG. 5 presents a sectional side elevation view of the disc filter assembly initially illustrated in FIG. 1 taken vertically along a longitudinal centerline.
Figure 6:
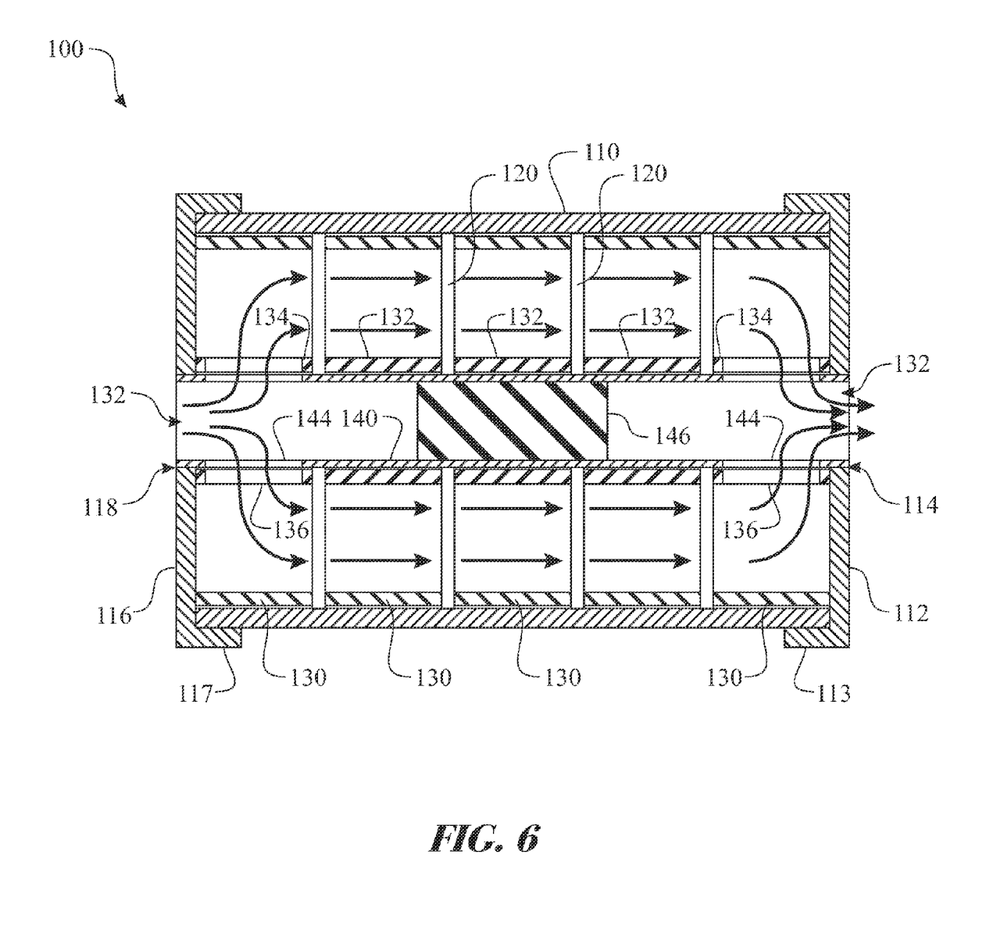
FIG. 6 presents a sectional side elevation view of the disc filter assembly as illustrated in FIG. 5, detailing a fluid flow.

The present invention provides a disc filter cartridge assembly 100, as detailed in the illustrations of FIGS. 1 through 6, for low cost filtration of a fluid. A series of disc filter cartridge assemblies 100 can be configured in series, as illustrated in FIG. 1, having a supply flow conduit 160 for supplying a fluid into the first disc filter cartridge assembly 100, an intermediate flow conduit 162 for transferring the fluid between two adjacent disc filter cartridge assemblies 100 of the series, and a return flow conduit 164 for discharging the filtered fluid from the last disc filter cartridge assembly 100 in the series.

The disc filter cartridge assembly 100 utilizes an elongated tubular filter body 110 as a primary element of the assembly. The exemplary elongated tubular filter body 110 is fabricated of a transparent tubular section. The exemplary elongated tubular filter body 110 is formed of a tubular material having an exterior surface 311, an interior surface 312, a first edge 316 and a second edge 318. The interior surface 312 defines an interior void 310 for receiving the filtering materials.

A first filter end cap 112 and a second filter end cap 116 are fabricated having a first end cap flange 113 and a second end cap flange 117 respectively. The end caps 113, 117 are designed to removably mate with the ends of the elongated tubular filter body 110. The mating interface between the end caps 113, 117 and the elongated tubular filter body 110 can be of any form factor, including a quick disconnect, a threaded interface, a slip fit (secured by a third member), and the like. Threading 313 can be formed on an interior surface of a first end cap flange 113 for mating with threading 315 formed on the exterior surface 311 of each respective end of the elongated tubular filter body 110. The threading enables the assembly to apply a desired pressure between an interior surface of each end cap 112, 116 and an outer filter support member end wall 131 as well as a central transfer filter support member 134. It is understood that the threading 313 can be placed upon an exterior surface of the first end cap flange 113 for mating with threading 315 formed on the interior surface 312 of each respective end 316, 318 of the elongated tubular filter body 110.

A first filter end cap orifice 114 is formed through the first filter end cap 112, wherein the first filter end cap orifice 114 is located in registration with a central conduit 142 of a tubular core and inner support member 140. Similarly, a second filter end cap orifice 118 is formed through the second filter end cap 116, wherein the second filter end cap orifice 118 is also located in registration with the central conduit 142. The filter end cap orifices 114, 118 preferably include an attachment feature for removably securing the tubular core and inner support member 140. One exemplary attachment feature would be a circular flange extending inward from the filter end caps 112, 116. The tubular core and inner support member 140 would engage with the circular flange. An outer diameter of the tubular core and inner support member 140 would mate with an inner diameter of the circular flange. A section of the filter end caps 112, 116 would continue inward retaining the tubular core and inner support member 140 within the disc filter cartridge assembly 100. It is understood that the second filter end cap 116 could be integrated into the elongated tubular filter body 110 or permanently attached to the elongated tubular filter body 110 forming an end wall. The filter end caps 112, 116 can be fabricated of a molded plastic, a machined or cast metal, and the like. A seal can optionally be integrated between the filter end caps 112, 116 and the elongated tubular filter body 110 to ensure a fluid-tight seal therebetween.

The exemplary tubular core and inner support member 140 is fabricated of a section of tubular material having an outer diameter and an inner diameter. The exemplary tubular core and inner support member 140 includes a series of central transfer conduits 144 spatially arranged about a perimeter of the tubular core and inner support member 140 proximate each end. A flow diversion member 146 can be inserted into the tubular core and inner support member 140 and secured centrally between the two ends of the tubular core and inner support member 140. The flow diversion member 146 diverts the fluid from the tubular core and inner support member 140 through the series of central transfer conduit 144.

At least one filtration disc 120 is inserted into the elongated tubular filter body 110, the filtration disc 120 provided to filter a passing fluid. An outer filter support member 130 is inserted into an interior of the elongated tubular filter body 110. The exemplary outer filter support member 130 is fabricated of a transparent tubular material having an outer diameter and an inner diameter. The outer diameter of the outer filter support member 130 preferably is of a dimension similar to an inner diameter of the elongated tubular filter body 110. Alternately, the outer filter support member 130 can include features that extend to an inner surface of the elongated tubular filter body 110. The inner diameter of the outer filter support member 130 is preferably smaller than an overall diameter of the filtration disc 120, whereby an outer filter support member end wall 131 of the outer filter support member 130 is positioned against a peripheral portion of the filtration disc 120.

Figure 8:
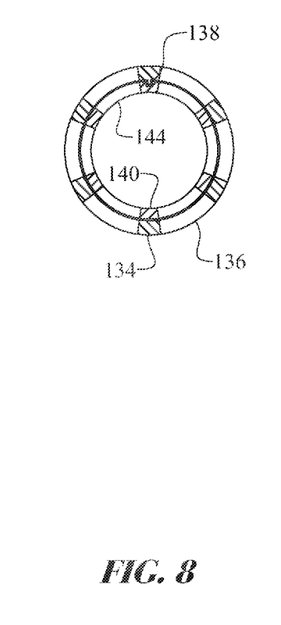
FIG. 8 presents a sectioned end view of a central transfer filter support member assembled to a tubular core and inner support member.

A central transfer filter support member 134 is slideably inserted over the outer filter support member 130 into an interior of the elongated tubular filter body 110. The central transfer filter support member 134 is positioned at each end of the outer filter support member 130. A central filter support member 132 can be used in placed of the central transfer filter support member 134 where the central filter support member 132 is not positioned in conjunction with the central transfer conduit 144 formed through the tubular core and inner support member 140. The exemplary central transfer filter support member 134 is fabricated of a tubular material having an outer diameter and an inner diameter. The inner diameter of the central transfer filter support member 134 preferably is of a dimension similar to an outer diameter of the tubular core and inner support member 140. Alternately, the central transfer filter support member 134 can include features that extend inward to an outer surface of the tubular core and inner support member 140. The outer diameter of the central transfer filter support member 134 is preferably smaller than a diameter of the filtration disc assembly aperture 122, whereby an inner filter support member end wall (similar to the outer filter support member end wall 131) of the central transfer filter support member 134 is positioned against a peripheral portion of the filtration disc assembly aperture 122. A central transfer filter registration feature 138 can be integrated into the central transfer filter support member 134 and tubular core and inner support member 140 to ensure proper alignment between the central transfer filter orifice 136 and the central transfer conduit 144, as illustrated in FIG. 8. The central transfer filter registration feature 138 can be of any reasonably known feature, including a tab and slot interface (as illustrated), and the like.

The first outer filter support member 130 and central transfer filter support member 134 are positioned against in inner surface of the second filter end cap 116. The central transfer filter orifice 136 is aligned with the central transfer conduit 144. A first filtration disc 120 is assembled to the tubular core and inner support member 140 by sliding the tubular core and inner support member 140 through the filtration disc assembly aperture 122. The filtration disc 120 seats against the outer filter support member end wall 131 of the outer filter support member 130. A second outer filter support member 130 and central filter support member 132 are inserted into the elongated tubular filter body 110 and seated against the opposite side of the filtration disc 120. The sandwiching design provides support and rigidity to the filtration disc 120. The assembly process is repeated until reaching the opposite end of the tubular core and inner support member 140, ending with the assembly of a second central transfer filter support member 134 and a final outer filter support member 130. The first filter end cap 112 is removably assembled to the elongated tubular filter body 110. The series of outer filter support members 130 and the series of central filter support members 132, each provide a compression force to the sandwiched filtration disc(s) 120 when assembled between the first filter end cap 112 and either contiguous end wall or second filter end cap 116. It is preferred that the length of the outer filter support members 130 and the length of the central filter support members 132 are the same to provide equal compression against the sandwiched filtration disc(s) 120.

Fluid enters a central filter support member 132 at an entrance end of the tubular core and inner support member 140. The fluid is diverted by the flow diversion member 146 to flow through the series of central transfer conduit 144 and mating central transfer filter orifice 136. The fluid continues, passing through each of the series of filtration disc 120. The fluid is filtered as it passes through the filtration disc 120. The filtration disc 120 can be of similar porosities or decreasing porosities dependent upon the desired filtration process. The filtered fluid returns, passing through the second central transfer filter orifice 136 and respective central transfer conduit 144, discharging through the second central filter support member 132.

Figure 7:
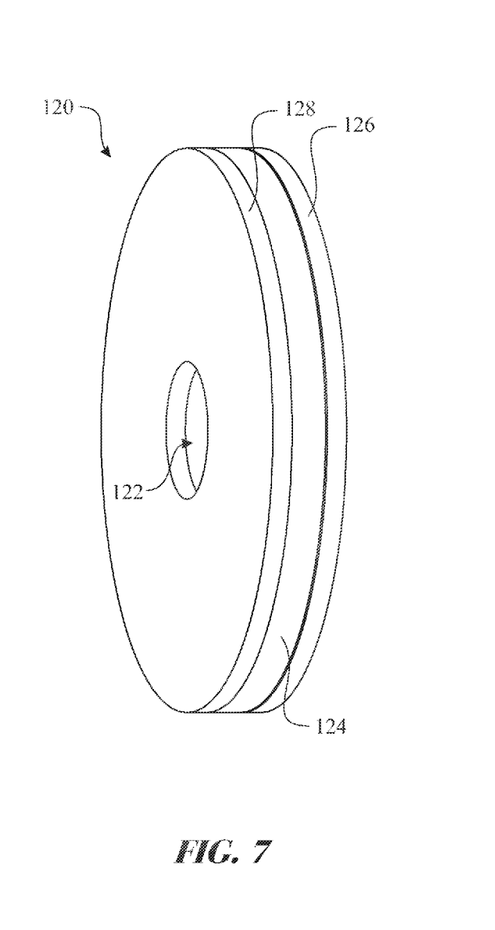
FIG. 7 presents an isometric view of an exemplary embodiment of a laminated filtration disc.

The filtration disc 120 can be fabricated of a single material or a laminate of multiple materials as illustrated in FIG. 7. The exemplary filtration disc 120 illustrated in FIG. 7 is fabricated by laminating a first outer filter layer 126 to a first planar surface of a filter central core 124 and a second outer filter layer 128 to the opposite planar surface of the filter central core 124. The layers can be of any reasonable filtration material, including paper, felt, charcoal impregnated material, a wire mesh or other screening, and the like.

Figure 9:
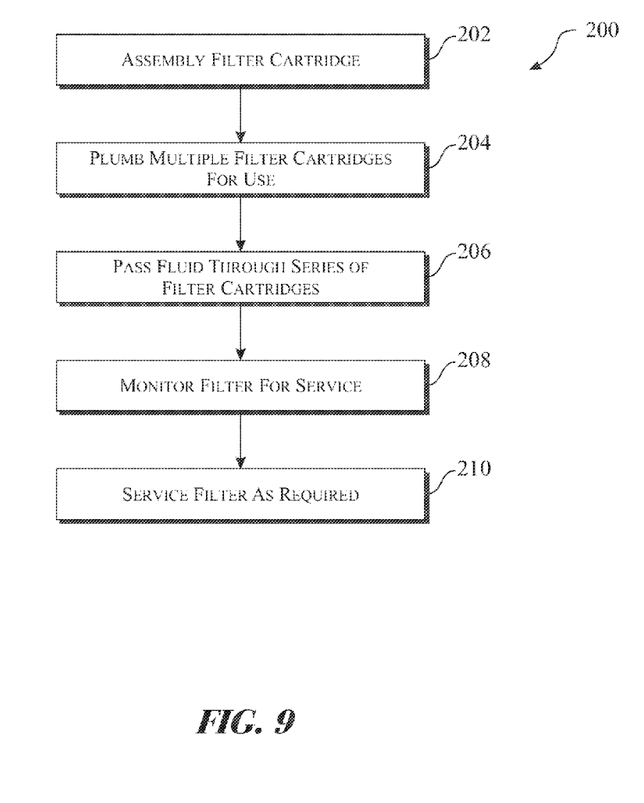
FIG. 9 presents an exemplary operational flow diagram using the disc filter assembly.

The disc filter cartridge assembly 100 can be used in accordance with an exemplary operational flow diagram 200 presented in FIG. 9. The operational flow diagram 200 initiates with a step of assembling 202 the disc filter cartridge 100. The disc filter cartridge assembly 100 is plumbed for use 204 by connecting conduits 160, 162, 164 to the respective orifices 114, 118, providing fluid communication therebetween. The user then passes a fluid through 206 the disc filter cartridge 100 or series of disc filter cartridges 100. The user would monitor the filter for servicing 208 to determine when the filtration disc 120 should be replaced. As determined, a service person services 210 the disc filter cartridge 100. The service person separates the first filter end cap 112 from the elongated tubular filter body 110, removes the outer filter support members 130, central filter support members 132, central transfer filter support members 134, and filtration discs 120 from the elongated tubular filter body 110, and reassembles the component with replacement filtration discs 120. The first filter end cap 112 is reassembled and the disc filter cartridge assembly 100 is placed back into service.

Figure 10:
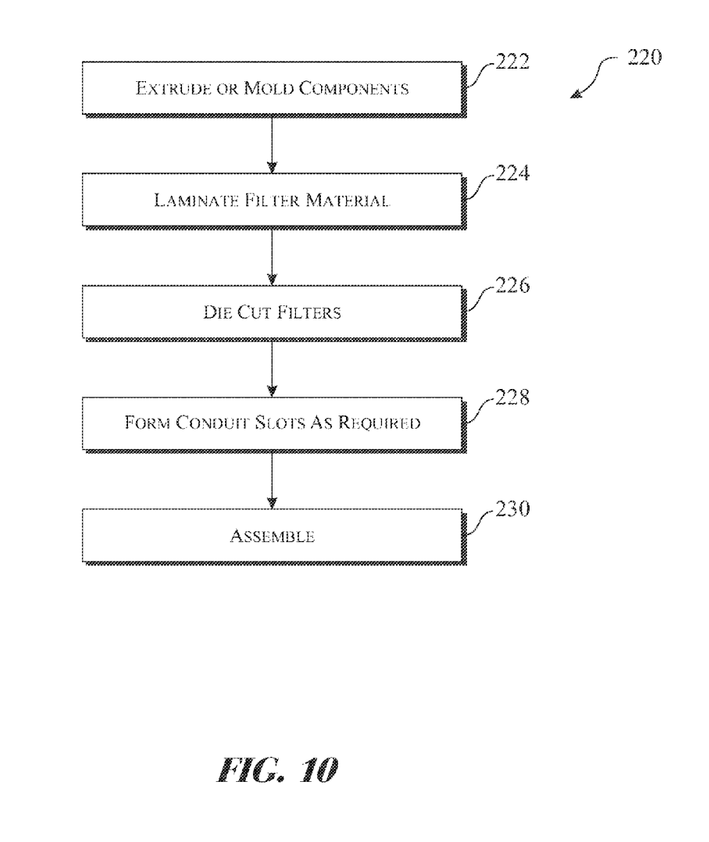
FIG. 10 presents an exemplary fabrication flow diagram for manufacturing the disc filter assembly.

The disc filter cartridge assembly 100 is fabricated in accordance with an exemplary fabrication flow diagram 220 presented in FIG. 10. The fabrication flow diagram 220 initiates with a step of fabricating 222 the tubular components 110, 130, 132, 134 and the respective end caps 112, 116. The fabrication step 222 can be completed by any respective known process or combination of known processes, including molding, extruding, machining, and the like. The filtration disc 120 is fabricated by using a single layer of filtration material 124 or laminating 224 a series of filtration materials 124, 126, 128. The filtration material is then cut to shape 226, preferably using a die cutting process. The central transfer filter orifice 136 and central transfer conduit 144 are formed 228 within the central transfer filter support member 134 and tubular core and inner support member 140 respectively by any reasonable known process, such as machining, water jet, laser cut, and the like. It is understood the central transfer filter orifice 136 and central transfer conduit 144 may be formed by a molding process within the step of fabricating 222 the tubular components above. Upon completion of the fabrication of the various components, the carious components are assembled together, creating the disc filter cartridge assembly 100. The disc filter cartridge assembly 100 can be tested for leaks if desired.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A liquid filter cartridge assembly, the assembly comprising:
    an elongated tubular filter body defined by a first body edge, a second body edge, an exterior surface spanning between the first body edge and the second body edge, and an interior surface spanning between the first body edge and the second body edge, said inner surface defining a interior void passing the elongated tubular filter body;
    a first filter end cap having a first filter orifice, the first filter end cap designed to removably engage with the elongated tubular filter body proximate the first body edge;
    an end wall having a second filter orifice, the end wall continuous about the second body edge;
    a tubular core and inner support member spanning between the first filter orifice and the second filter orifice;
    a first plurality of central transfer conduits located at a first end of the tubular core and inner support member;
    a second plurality of central transfer conduits located at an opposite end of the tubular core and inner support member;
    a flow diversion member located within an interior void of the tubular core and inner support member and between the first plurality of central transfer conduits and the second plurality of central transfer conduits;
    at least one filtration disc defined by an outer peripheral edge and having a centrally located filtration disc assembly aperture, wherein the outer peripheral edge of each of the at least one filtration disc is of a size and shape of the interior void defined by the inner surface of the elongated tubular filter body and the centrally located filtration disc assembly aperture is of a size and shape defined by a cross section of an exterior surface of the tubular core and inner support member;
    at least two outer filter support members, each outer filter support member having an outer diameter for placement and retention within the interior void of the elongated tubular filter body and an inner diameter sized to engage with the filtration disc perimeter;
    at least two central filter support members, each central filter support member having an inner diameter for placement onto an exterior of the tubular core and inner support member and an outer diameter sized to engage with the filtration disc proximate the filtration disc assembly aperture;
    wherein the at least two outer filter support members and the at least two central filter support members are detached from one another,
    wherein the tubular core and inner support member is inserted through the centrally located filtration disc assembly aperture, and outer filter support members and central filter support members are placed on each side of and sandwiching the filtration disc therebetween.

2. A liquid filter cartridge assembly as recited in claim 1, the first filter end cap further comprising an end wall and a first end cap flange extending generally perpendicularly from the end wall, the first filter end cap orifice being provided through the end wall.

3. A liquid filter cartridge assembly as recited in claim 2, the first end cap flange further comprising threading; and
    the first end of the elongated tubular filter body further comprising mating threading for engaging with the first end cap flange threading on a first end and with the second end cap flange threading on a second end.

4. A liquid filter cartridge assembly as recited in claim 1, the at least two outer filter support members are of a length, where the at least two outer filter support members create a compression force to the at least one filtration disc upon assembly of the at least two outer filter support members between the first filter end cap and the end wall.

5. A liquid filter cartridge assembly as recited in claim 1, the at least two central filter support members are of a length, where the at least two central filter support members create a compression force to the at least one filtration disc upon assembly of the at least two central filter support members between the first filter end cap and the end wall.

6. A liquid filter cartridge assembly as recited in claim 1, the at least one filtration disc further comprising a plurality of laminated layers.

7. A liquid filter cartridge assembly as recited in claim 1, wherein the elongated tubular filter body is transparent and the at least two outer filter support are transparent.

8. A liquid filter cartridge assembly, the assembly comprising:
    an elongated tubular filter body defined by a first body edge, a second body edge, an exterior surface spanning between the first body edge and the second body edge, and an interior surface spanning between the first body edge and the second body edge, said inner surface defining a interior void passing the elongated tubular filter body;

a first filter end cap having a first filter orifice, the first filter end cap designed to removably engage with the elongated tubular filter body proximate the first body edge;
a second filter end cap having a second filter orifice, the second filter end cap designed to removably engage with the elongated tubular filter body proximate the second body edge;
a tubular core and inner support member spanning between the first filter orifice and the second filter orifice;
at least one filtration disc defined by an outer peripheral edge and having a centrally located filtration disc assembly aperture, wherein the outer peripheral edge of each of the at least one filtration disc is of a size and shape of the interior void defined by the inner surface of the elongated tubular filter body and the centrally located filtration disc assembly aperture is of a size and shape defined by a cross section of an exterior surface of the tubular core and inner support member;
at least two outer filter support members, each outer filter support member having an outer diameter for placement and retention within the interior void of the elongated tubular filter body and an inner diameter sized to engage with the filtration disc perimeter;
at least two central filter support members, each central filter support member having an inner diameter for placement onto an exterior of the tubular core and inner support member and an outer diameter sized to engage with the filtration disc proximate the filtration disc assembly aperture;
wherein the at least two outer filter support members and the at least two central filter support members are detached from one another,
wherein the tubular core and inner support member is inserted through the centrally located filtration disc assembly aperture, and outer filter support members and central filter support members are placed on each side of and sandwiching the filtration disc therebetween.

9. A liquid filter cartridge assembly as recited in claim 8, the first filter end cap further comprising an end wall and a first end cap flange extending generally perpendicularly from a contact surface of the end wall, the first filter end cap orifice being provided through the end wall; and
the second filter end cap further comprising an end wall and a second end cap flange extending generally perpendicularly from a contact surface of the end wall, the second filter end cap orifice being provided through the end wall.

10. A liquid filter cartridge assembly as recited in claim 9, the first end cap flange further comprising threading;
the second end cap flange further comprising threading; and
each end of the elongated tubular filter body further comprising mating threading for engaging with the first end cap flange threading on a first end and with the second end cap flange threading on a second end.

11. A liquid filter cartridge assembly as recited in claim 8, the at least two outer filter support members are of a length, where the at least two outer filter support members create a compression force to the at least one filtration disc upon assembly of the at least two outer filter support members between the first filter end cap and the second filter end cap.

12. A liquid filter cartridge assembly as recited in claim 8, the at least two central filter support members are of a length, where the at least two central filter support members create a compression force to the at least one filtration disc upon assembly of the at least two central filter support members between the first filter end cap and the second filter end cap.

13. A liquid filter cartridge assembly as recited in claim 8, the at least one filtration disc further comprising a plurality of laminated layers.

14. A liquid filter cartridge assembly as recited in claim 8, wherein the elongated tubular filter body is transparent and the at least two outer filter support are transparent.

15. A liquid filter cartridge assembly, the assembly comprising:
an elongated tubular filter body defined by a first body edge, a second body edge, an exterior surface spanning between the first body edge and the second body edge, and an interior surface spanning between the first body edge and the second body edge, said inner surface defining a interior void passing the elongated tubular filter body;
a first filter end cap having a first filter orifice, the first filter end cap designed to removably engage with the elongated tubular filter body proximate the first body edge;
a second filter end cap having a second filter orifice, the second filter end cap designed to removably engage with the elongated tubular filter body proximate the second body edge;
a tubular core and inner support member spanning between the first filter orifice and the second filter orifice;
at least one filtration disc defined by an outer peripheral edge and having a centrally located filtration disc assembly aperture, wherein the outer peripheral edge of each of the at least one filtration disc is of a size and shape of the interior void defined by the inner surface of the elongated tubular filter body and the centrally located filtration disc assembly aperture is of a size and shape defined by a cross section of an exterior surface of the tubular core and inner support member;
at least two outer filter support members, each outer filter support member having a length, an outer diameter for placement and retention within the interior void of the elongated tubular filter body, and an inner diameter sized to engage with the filtration disc perimeter;
at least two central filter support members, each central filter support member having a length, an inner diameter for placement onto an exterior of the tubular core and inner support member, and an outer diameter sized to engage with the filtration disc proximate the filtration disc assembly aperture;
wherein the at least two outer filter support members and the at least two central filter support members are detached from one another,
wherein the length of the outer filter support members length and the length of the central filter support members length are of the same length;
wherein the length of the at least two outer filter support members are sufficient to apply a compression force to the at least one filtration disc upon assembly of the at least two outer filter support members between the first filter end cap and the second filter end cap;
wherein the length of the at least two central filter support members are sufficient to apply a compression force to the at least one filtration disc upon assembly of the at least two outer filter support members between the first filter end cap and the second filter end cap;
wherein the tubular core and inner support member is inserted through the centrally located filtration disc assembly aperture, and outer filter support members and central filter support members are placed on each side of and sandwiching the filtration disc therebetween.

16. A liquid filter cartridge assembly as recited in claim 15, the first filter end cap further comprising an end wall and a first end cap flange extending generally perpendicularly from a contact surface of the end wall, the first filter end cap orifice being provided through the end wall; and the second filter end cap further comprising an end wall and a second end cap flange extending generally perpendicularly from a contact surface of the end wall, the second filter end cap orifice being provided through the end wall.

17. A liquid filter cartridge assembly as recited in claim 16, the first end cap flange further comprising threading;

the second end cap flange further comprising threading; and each end of the elongated tubular filter body further comprising mating threading for engaging with the first end cap flange threading on a first end and with the second end cap flange threading on a second end.

18. A liquid filter cartridge assembly as recited in claim 15, the at least one filtration disc further comprising a plurality of laminated layers.

19. A liquid filter cartridge assembly as recited in claim 15, wherein the elongated tubular filter body is transparent and the at least two outer filter support are transparent.

20. A liquid filter cartridge assembly as recited in claim 15, the tubular core and inner support member further comprising a first plurality of central transfer conduits located at a first end of the tubular core and inner support member and a second plurality of central transfer conduits located at an opposite end of the tubular core and inner support member;

a flow diversion member located within an interior void of the tubular core and inner support member and between the first plurality of central transfer conduits and the second plurality of central transfer conduits.

\* \* \* \* \*